(12) United States Patent
Morin et al.

(10) Patent No.: US 8,561,298 B2
(45) Date of Patent: Oct. 22, 2013

(54) SUPERALLOY COMPONENT WELDING AT AMBIENT TEMPERATURE

(75) Inventors: James A. Morin, Oviedo, FL (US);
Lucian Iordache, Stoney Creek (CA);
Ovidiu Timotin, Hamilton (CA);
Sooyeum Oh, Burlington (CA)

(73) Assignee: Siemens Energy, Inc., Orlando, FL (US)

( * ) Notice: Subject to any disclaimer, the term of this patent is extended or adjusted under 35 U.S.C. 154(b) by 1547 days.

(21) Appl. No.: 12/039,966

(22) Filed: Feb. 29, 2008

(65) Prior Publication Data

US 2008/0210347 A1    Sep. 4, 2008

Related U.S. Application Data

(60) Provisional application No. 60/904,301, filed on Mar. 1, 2007.

(51) Int. Cl.
*B21K 25/00* (2006.01)
*B23P 15/04* (2006.01)

(52) U.S. Cl.
USPC ........ 29/889.21; 29/889; 29/889.1; 29/889.2; 29/889.7; 228/226

(58) Field of Classification Search
USPC .............................. 29/889–889.722; 228/226
See application file for complete search history.

(56) References Cited

U.S. PATENT DOCUMENTS

| | | |
|---|---|---|
| 4,336,312 A | 6/1982 | Clark et al. |
| 4,804,815 A | 2/1989 | Everett |
| 4,965,095 A | 10/1990 | Baldi |
| 5,040,718 A | 8/1991 | Lee et al. |
| 5,106,010 A | 4/1992 | Stueber et al. |
| 5,142,778 A | 9/1992 | Smolinski et al. |
| 5,374,319 A | 12/1994 | Stueber et al. |
| 5,509,980 A | 4/1996 | Lim |
| 5,554,837 A | 9/1996 | Goodwater et al. |
| 5,732,467 A | 3/1998 | White et al. |
| 5,785,775 A | 7/1998 | Smashey et al. |
| 5,897,801 A | 4/1999 | Smashey et al. |
| 6,084,196 A | 7/2000 | Flowers et al. |
| 6,191,379 B1 | 2/2001 | Offer et al. |
| 6,333,484 B1 | 12/2001 | Foster et al. |
| 6,364,971 B1 | 4/2002 | Peterson, Jr. et al. |
| 6,376,801 B1 | 4/2002 | Farrell et al. |

(Continued)

OTHER PUBLICATIONS

CM-247 LC, http://www.c-mgroup.com/spec_sheets/CM_247.htm, retrieved May 1, 2006, 3 pages.

(Continued)

*Primary Examiner* — Richard Chang

(57) ABSTRACT

A method for welding superalloy components at ambient temperature conditions while reducing the propensity of the superalloy material to crack as a result of the weld. A root pass region of the weld is formed using a filler material that exhibits ductility that is higher than that of the base superalloy material. The ductile material mitigates stress in the root region, thereby preventing the formation of cracks. A remaining portion of the weld is formed using a filler material that essentially matches the base superalloy material. The method may utilize a pre-weld heat treatment to grow a gamma prime precipitate phase in the superalloy material, a chill fixture to remove heat during welding, a relief cut to reduce stress in the root region, and a conventional post-weld heat treatment.

10 Claims, 1 Drawing Sheet

(56) References Cited

U.S. PATENT DOCUMENTS

| | | |
|---|---|---|
| 6,489,584 B1 | 12/2002 | Kelly |
| 6,491,207 B1 | 12/2002 | Smashey et al. |
| 6,495,793 B2 | 12/2002 | Tewari |
| 6,659,332 B2 | 12/2003 | Smashey et al. |
| 6,872,912 B1 | 3/2005 | Wos et al. |
| 6,902,617 B2 | 6/2005 | Betz |
| 6,908,288 B2 | 6/2005 | Jackson et al. |
| 6,972,390 B2 | 12/2005 | Hu et al. |
| 7,533,795 B2 * | 5/2009 | Schaeffer et al. ............. 228/226 |
| 7,653,995 B2 * | 2/2010 | Morin ........................ 29/889.1 |

OTHER PUBLICATIONS

Nickel Base DS, http://www.c-mgroup.com/vacuum_melt_index/nickel_base_ds.htm, retrieved May 1, 2006, 1 page.

* cited by examiner

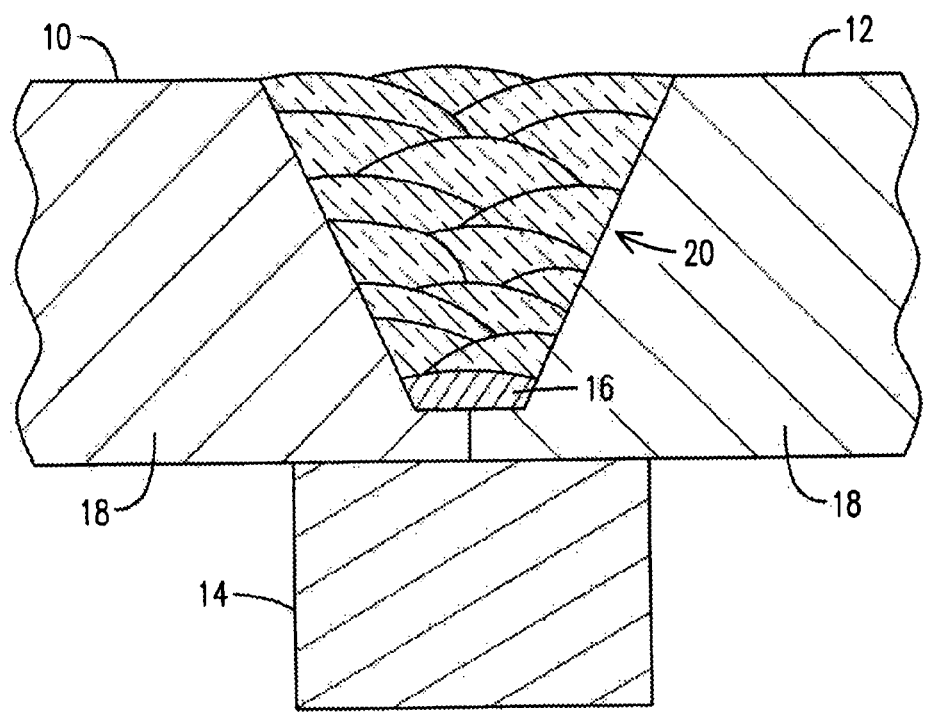

SUPERALLOY COMPONENT WELDING AT AMBIENT TEMPERATURE

This application claims benefit of the 1 Mar. 2007 filing date of provisional U.S. patent application 60/904,301.

FIELD OF THE INVENTION

This invention relates to a method of welding and repair of superalloy components such as gas turbine blades.

BACKGROUND OF THE INVENTION

Nickel-based and cobalt-based superalloy materials are commonly used to provide high mechanical strength for very high temperature applications, such as for the blades or other components of a gas turbine engine. Such components are very expensive, and thus the repair of a damaged part is preferred over its replacement. However, known weld repair techniques for superalloy materials have met with only limited success, due primarily to the propensity of superalloy materials to develop cracks during such welding operations. In addition to hot cracking of the weld filler metal and heat affected zone, these materials exhibit strain age cracking, which results in cracks in the base metal of the component.

Several techniques have been proposed to improve the weldability of superalloy materials. U.S. Pat. No. 4,336,312 describes a combination of a controlled chemical modification of a cast nickel-based superalloy material along with a pre-weld thermal conditioning cycle. U.S. Pat. No. 6,364,971 describes a laser welding technique used following a pre-conditioning hot isostatic process. U.S. Pat. No. 6,333,484 describes a welding technique wherein the entire weld area is preheated to a maximum ductility temperature range, and this elevated temperature is maintained during the welding and solidification of the weld. Each of these patents is incorporated by reference herein.

The assignee of the present invention produces gas turbine engines utilizing a variety of materials, including blades formed of a directionally solidified (DS) cast nickel-based superalloy material sold by Cannon-Muskegon Corporation under the designation CM-247 LC. CM-247 LC is known to have the following nominal composition, expressed as weight percentages: carbon 0.07%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel. Such blades are typically repaired by welding at elevated temperatures, so called hot-box welding, utilizing specially selected filler metal. Hot-box weld repairs may take eight hours or more to complete, and the requirement for working inside of the hot box to maintain the elevated temperature makes it difficult to perform such welds robotically.

BRIEF DESCRIPTION OF THE DRAWINGS

The invention is explained in the following description in view of the sole drawing that shows a superalloy component welded under ambient conditions in accordance with an embodiment of the invention.

DETAILED DESCRIPTION OF THE INVENTION

The assignee of the present invention has developed a method for welding superalloy materials at ambient temperature which is the subject of co-pending U.S. patent application Ser. No. 11/497,113, filed 1 August 2006, incorporated by reference herein. Ambient temperature is understood to be the general room temperature that is reasonable for human activity, and is typically between 65-80° F. The present inventors herein disclose improvements that further enhance such welding processes and that can provide a high yield rate of crack-free welds for difficult applications such as the welding of a replacement tip cap 10 to a gas turbine blade 12. The present inventors have recognized three crack formation mechanisms. First, strain age cracking, which is addressed with the overaging heat treatment in the above-referenced patent application and described further below. This heat treatment increases base metal ductility with the growth of gamma prime, thereby increasing weldability. Second, solidification cracking, which is addressed with the addition of a ductile filler root pass, as described more fully below. Third, grain boundary liquation (dissolution of the MC, M6C carbides at the grain boundaries in the heat affected zone), which is addressed by minimizing the heat affected zone by using a chill block 14, as described more fully below.

The present inventors have discovered improved results by utilizing a root region weld filler material 16 that has a higher ductility than the base superalloy material 18 and a higher ductility than the filler material that is utilized for the remaining portion of the weld 20. The higher ductility root region material provides a degree of flexibility in the weld that serves to mitigate the stresses induced by welding, thereby preventing the initiation of cracks. The required overall strength of the weld is maintained by the overlying remaining portion of the weld which is made of higher strength material which exhibits lower ductility. As applied to the ambient temperature welding of a replacement tip cap to a gas turbine blade made of superalloy material, the present invention may include the creation of relief cuts in the partition wall of the blade proximate the respective pressure and suction sides of the blade wall. The relief cuts provide additional stress relief in the root region for the more highly constrained regions of the blade proximate the partition wall.

One embodiment of the present invention for a method of welding a component made of a nickel-based, gamma prime strengthened superalloy material such as CM-247 LC material includes pre-weld heat treating the superalloy component to grow the gamma prime precipitate phase in the superalloy material to a desired volume percentage such as 40-55%. One embodiment involves utilizing a pre-weld conditioning soak temperature that is below the solution heat treatment temperature of the superalloy component. The soak temperature may be as much as about 65 or 70 or 75° F. (about 36 or 39 or 42° C.) below the solution heat treatment temperature, or as little as 15 or 20 or 25° F. (about 8 or 11 or 14° C.) below the solution heat treatment temperature, or within a range between any two of those temperatures, The superalloy component may be heated in a vacuum furnace with a working pressure of no more than about $2 \times 10^{-3}$ torr in one embodiment, and holding that pressure throughout the heating, soaking and cooling steps, The superalloy component may be heated at a rate of about 28±5° F. (about 15±3° C.) per minute (i.e. increasing the temperature of the furnace at that rate), although the heat-up rate has been found not to be critical and may be a different rate so long as it is not so fast as to cause cracking or detrimental distortion of the superalloy component. The temperature is then maintained at the soak temperature for a time period sufficiently long to allow the elevated temperature to soak the entire thickness of the superalloy component, or at least the entire thickness of the superalloy component that will be affected by subsequent fusion welding, such as about one hour per inch of thickness.

Upon completion of the heat-up and soak steps, the superalloy component is then slowly cooled by cooling the furnace temperature to grow the gamma prime to a desired volume percentage. The superalloy component may be cooled at a rate of about 1° F. (about 0.5° C.) per minute to an intermediate temperature that is reduced from the soak temperature but is still above a minimum gamma prime growth temperature of the superalloy component. The purpose of the slow cool down step it to grow the gamma prime precipitate phase in the superalloy component to a desired volume percentage of 40-55%. The cool down rate may be in the range of 1±05° F. (0.5±0.28° C.). The superalloy component is then cooled rapidly to a temperature that is below the minimum gamma prime growth temperature of the material, such as by gas fan quench cooling to a temperature of no more than about 300° F. (about 149° C.) or as low as about 125° F. (about 52° C.).

The component may then be secured in a chill fixture or otherwise arranged for the removal of heat from those portions of the component heated by welding. By limiting the temperature rise of material proximate the weld, the level of stress imposed on the region of the weld is mitigated, thereby reducing the chance of forming cracks upon cooling. The chill fixture may be made out of material that readily conducts and absorbs heat Aluminum or copper are examples of such materials, although care must be taken to avoid the introduction of these materials, especially copper, into the weld pool. The chill fixture may be geometry specific so as to make good contact with the base superalloy component in order to absorb effectively the heat introduced into the superalloy component by the welding process. The chill fixture may be actively cooled, such as with ambient temperature water. The chill fixture may also be adapted to provide connections for the supply of an inert backing gas, such as argon, to surround the weld region in order to preserve the integrity of the weld.

The present invention includes welding an initial root region of a structural weld to a component formed of a superalloy material by using a filler material exhibiting ductility greater than the ductility of the base superalloy material. The ductility may be measured by any known technique and is usually expressed as a modulus of elasticity. The filler material is selected to be more ductile than the base superalloy component material and to be compatible and weldable to the base superalloy component material. For example, for a base superalloy material of CM-247 LC alloy, the root region filler material may be a Hastelloy® W or IN625 alloy weld filler wire. The root region of the weld formed with this higher-ductility material may be as little as a single root pass or as much as 25% of the total weld thickness or wall thickness for various embodiments. For purposes of stress accommodation, it is generally desired to be on the high side of this range, but because most materials having relatively high ductility also tend to have relatively lower strength, the amount of the ductile root region filler material may be limited by requirements for the overall strength of the weld. In one embodiment, the present inventors have conservatively modeled the root region to be a void in order to confirm that the overall strength of the weld is adequate.

After the root region of the weld is formed, the remaining portion of the structural weld is formed with a structural filler material different than the root pass filler material. The structural filler material is selected to have a desired high temperature strength and will therefore exhibit ductility that is less than that of the root region filler material. The strength and ductility of the structural filler material may match that of the base superalloy material. The structural filler material may be any conventional material and may be in the form of a weld rod or powder for example. For the embodiment of a CM-247LC superalloy turbine blade with Hastelloy W or IN625 alloy weld filler wire used for the root pass region, the remainder of the weld may be made with MarM247 alloy, for example. Because the present invention eliminates the need for hot box welding, the welding steps may more conveniently be performed using robotic systems. After completion of the structural weld, the superalloy component may be subjected to a conventional post-weld heat treatment.

Various embodiments of the present invention involve welding to known nickel-based gamma prime precipitation strengthened superalloys such as IN738, CM247, Rene 80, GTD111, Rene 125, Rene 142, Rene N5, SCI80, CMSX-2, CMSX-4, CMSX-10, PWA 1480 and PWA 1484 alloys. Embodiments of the lower ductility root pass region filler metals may include a solid solution strengthened alloy such as Hastelloy W or IN625 alloys. Alternatively, if such lower strength solution strengthened alloys are not structurally acceptable for even just the root portion of the weld, an undermatching (lower strength than the base material alloy) precipitation strengthened alloy exhibiting a ductility higher than that of the base alloy material may be used for the root portion, such as for example Rene 41 or Haynes 282. The remaining portion of the weld may be formed with precipitation strengthened alloys with properties essentially matching those of the base alloy, such as MarM247, IN738, IN939, or Rene 80, for example. The relatively weak/ductile root region filler material preferentially absorbs the strains that occur in the base metal as the precipitate re-forms in the heat affected zone (HAZ) during the cool down after the weld pass.

For an embodiment of the present invention applied to the replacement of a damaged gas turbine blade tip, the worn blade tip may be removed by conventional techniques and a conventionally cast replacement tip cap prepared for welding. The edges of the replacement tip cap may be chamfered to a 50-70° inner angle to form a 110-130° outer angle with the prepared gas turbine blade wall when placed thereon so as to reduce stress risers formed with typical 90° corner welds. The replacement tip cap may be tack welded to hold it in place during structural welding. The blade material may be subjected to a heat treatment to grow a gamma prime precipitate phase in the superalloy material to a desired volume percentage such as to 40-55% prior to welding. Many gas turbine blade designs include a partition wall interconnecting the pressure and suction sides of the blade wall for the purpose of defining cooling passages within the blade. The partition walls constrain the blade walls and tend to increase the level of stress in the adjoining weld when the replacement tip cap is installed. Accordingly, it may be desired in one embodiment to remove some material at each opposed end of the exposed top of the partition wall to form a small relief cut proximate each of the pressure and suction side walls. Such relief cuts provide room for the root pass weld bead and they serve to reduce the stresses induced by the weld in this region of the component.

The method of welding a replacement tip cap to a gas turbine blade includes welding an initial root portion (root pass only or additional passes up to 25% of the wall) of a structural weld between the gas turbine blade and the replacement tip cap at ambient temperature while removing heat from the region of the weld via a chill fixture by using a filler material exhibiting a ductility greater than the ductility of the base superalloy material of the blade. The method further involves completing the structural weld at ambient temperature while removing heat from the region of the weld via the chill fixture with a structural filler material different than the root region material and having a ductility that is less than that of the root region filler material. The structural filler material would exhibit that at least essentially matches the strength of the precipitated hardened base gas turbine blade material at elevated temperatures. The blade may then be subjected to a conventional post-weld heat-treatment. The gas turbine blade may also be prepared for service by utilizing standard processes such as machining the blade to a final contour and applying a thermal barrier coating to an exterior surface of the blade.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of welding to a component formed of a nickel-based precipitation strengthened superalloy material, the method comprising:
   heat-treating the component to grow a gamma prime precipitate phase in the superalloy material to a volume percentage of 40-55%;
   welding a root portion of a structural weld to the component at ambient temperature while removing heat from the component via a chill fixture by using a root portion filler material exhibiting a ductility greater than a ductility of the superalloy material;
   completing the structural weld at ambient temperature while removing heat from the component via the chill fixture by using a structural filler material exhibiting a strength greater than and a ductility less than that of the root portion filler material; and
   post-weld heat-treating the component.

2. The method according to claim 1, wherein the superalloy material comprises one of the group of CM-247LC, IN738, CM247, Rene 80, GTD111, Rene 125, Rene 142, Rene N5, SC180, CMSX-2, CMSX-4, CMSX-10, PWA 1480 and PWA 1484 alloys, the root portion filler material comprises one of the group of Hastelloy W, IN625, Rene 41, Haynes 282 alloys, and the structural filler material comprises one of the group of MarM247, IN738, IN939, and Rene80 alloys.

3. The method according to claim 1, wherein the root portion of the weld formed with the root portion filler material comprises a root pass only.

4. The method according to claim 1, wherein the root portion of the weld formed with the root portion filler material comprises at least a root pass only and up to 25% of a total weld thickness.

5. A method of welding to a superalloy material wherein the improvement comprises:
   forming a root portion of a structural weld to a superalloy material using a filler material exhibiting a ductility greater than a ductility of the superalloy material; and
   forming a remaining portion of the structural weld using a filler material exhibiting a strength greater than and a ductility less than that of the root portion filler material;
   wherein the improvement further comprises heat treating the superalloy material prior to forming the root portion of the weld to grow a gamma prime precipitate phase in the superalloy material to a desired volume percentage.

6. The method of claim 5, wherein the improvement further comprises heat treating the superalloy material prior to forming the root portion of the weld to grow the gamma prime precipitate phase in the superalloy material to a volume percentage of 40-55%.

7. The method according to claim 5, wherein the root portion of the structural weld formed with the root portion filler material comprises a root pass only.

8. The method according to claim 5 as applied to a nickel based precipitation strengthened superalloy material, and further comprising:
   forming the root portion of the structural weld using a solid solution strengthened alloy filler material; and
   forming the remaining portion of the structural weld using a precipitation strengthened alloy filler material.

9. The method according to claim 5 as applied to a nickel based precipitation strengthened superalloy material, and further comprising:
   forming the root portion of the structural weld using a precipitation strengthened alloy filler material exhibiting a ductility greater than the ductility of the superalloy material; and
   forming the remaining portion of the structural weld using a precipitation strengthened alloy filler material essentially matching the superalloy material.

10. The method according to claim 5, wherein the root portion of the structural weld formed with the root portion filler material comprises at least a root pass only and up to 25% of a total weld thickness.

* * * * *